Figure 7:
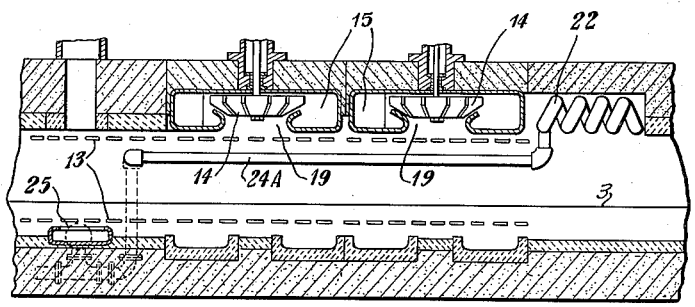

May 2, 1961 A. LAWSON 2,982,052
LEHRS FOR GLASSWARE
Filed Jan. 6, 1956 4 Sheets-Sheet 1
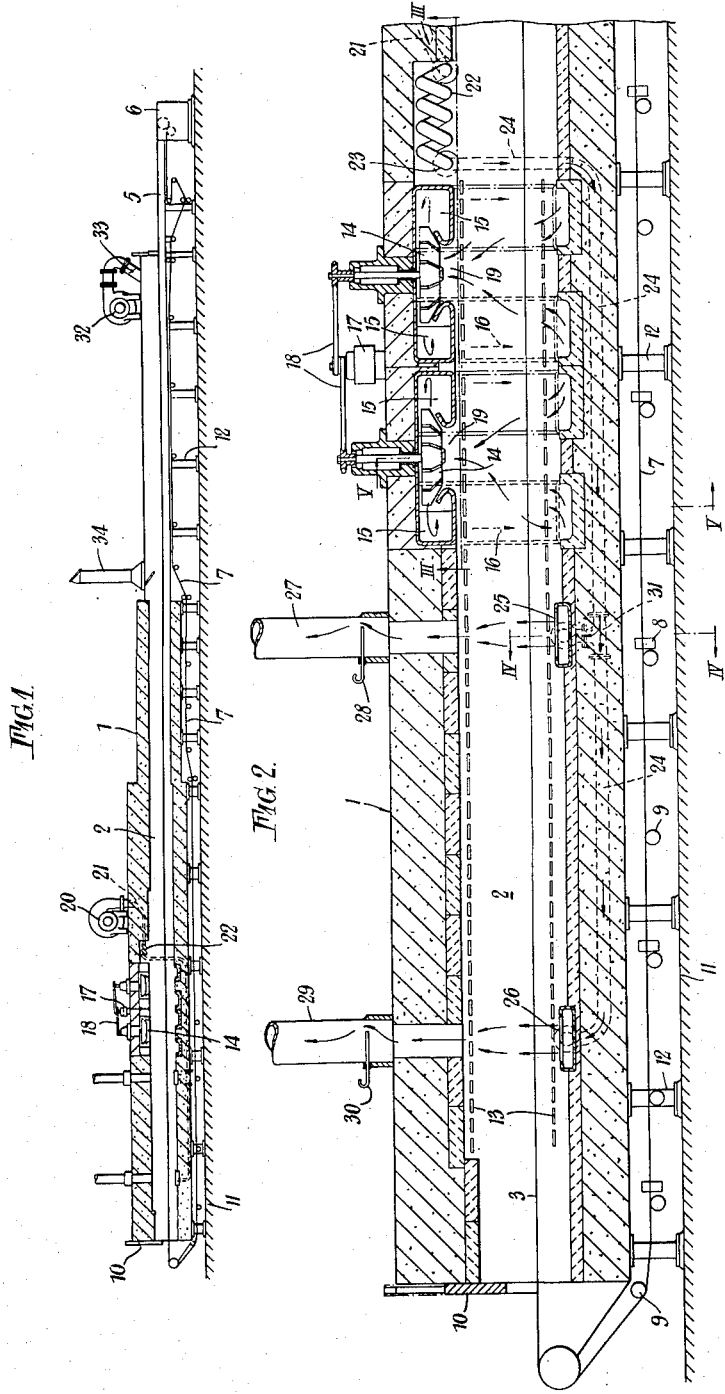
Inventor: Alec Lawson
By his attorneys:
Baldwin & Wight

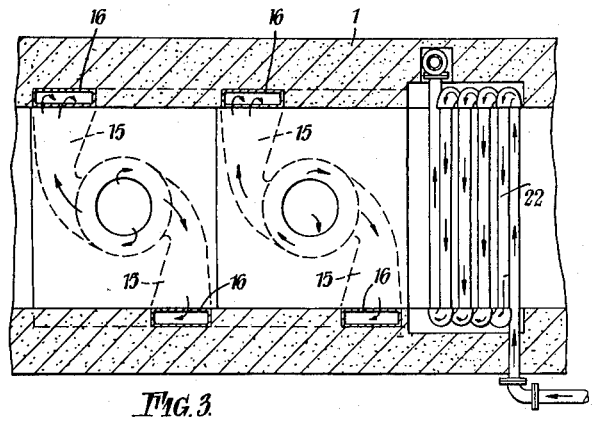
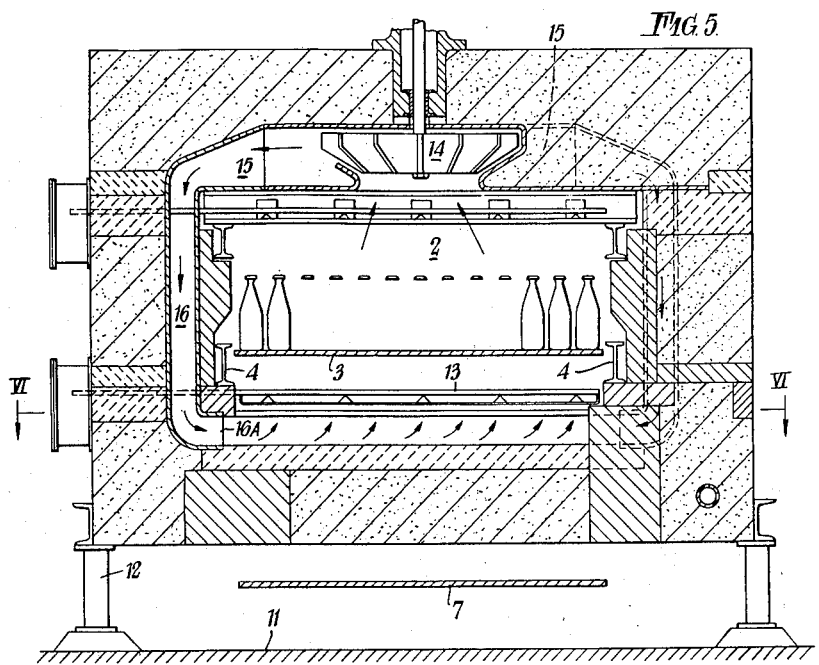

May 2, 1961  A. LAWSON  2,982,052
LEHRS FOR GLASSWARE
Filed Jan. 6, 1956  4 Sheets-Sheet 3
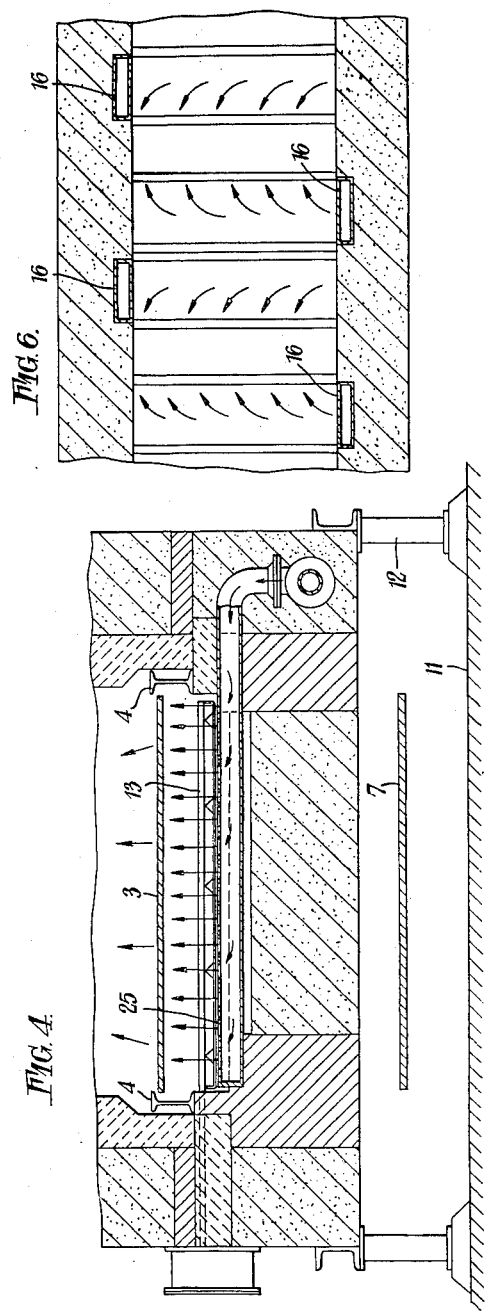
Inventor:
Alec Lawson
By his attorney:
Baldwin & Wight INVENTOR.
Alec Lawson
BY Baldwin & Wight
ATTORNEYS

United States Patent Office 2,982,052
Patented May 2, 1961

2,982,052
LEHRS FOR GLASSWARE

Alec Lawson, Wembley, England, assignor to British Hartford-Fairmont Limited, Greenford, England, a British company Filed Jan. 6, 1956, Ser. No. 557,807
Claims priority, application Great Britain July 28, 1955
12 Claims. (Cl. 49—47)

This invention relates to lehrs for glassware and, in particular, to decorating lehrs for treating glassware on which decorative matter of a ceramic nature in a vapourisable vehicle, such as wax, has been placed, the treatment being such that the decorating matter on the glassware is first heated to drive off the vehicle, the ceramic decorative matter then being fused or matured. Thereafter the decorated ware is annealed, or re-annealed in the lehr.

According to the invention there is provided a lehr for glassware on which ceramic decorative matter in a vapourisable vehicle has been placed, comprising means for conveying the ware through the lehr, means for heating the ware during the first part of its journey through the lehr, means for introducing air into the lehr at about a first zone in which the said vehicle vapourises, means for preheating said air to a temperature substantially equal to, or greater than, the temperature in said first zone, means for venting the introduced air which carries with it the vapours resulting from the vapourisation of said vehicle, means for introducing further air into the lehr at about a second zone in which carbonaceous material derived from said vehicle will burn, means for preheating said further air to a temperature substantially equal to, or greater than, the temperature in said second zone, and means for venting the introduced further air which carries with it gases resulting from the combustion of said carbonaceous material.

For a better understanding of the invention, and to show how the same may be carried into effect, reference will now be made to the accompanying drawings in which:

Figure 1 shows a longitudinal vertical section through a lehr,

Figure 2 shows an enlarged longitudinal vertical section through part of the lehr shown in Figure 1, Figure 3 shows a horizontal section along the line III—III of Figure 2, Figure 4 shows a vertical section along the line IV—IV of Figure 2, Figure 5 shows a vertical section along the line V—V of Figure 2, Figure 6 shows a horizontal section along the line VI—VI of Figure 5, and Figure 7 is a view corresponding to part of Figure 2, but showing a modification of the lehr.

Referring now to the drawings there is shown a lehr for treating glassware on which decorating matter of a ceramic nature has been placed. The lehr has walls 1 surrounding a rectangular passage or chamber 2 extending longitudinally through the lehr for the full length thereof, the chamber being rectangular in cross-section. An endless conveyor of openwork material, such as woven wire fabric, is provided in the lehr for transporting the glassware to be treated through the lehr chamber. The upper reach 3 of this endless conveyor passes completely through the chamber longitudinally thereof, and is supported in a horizontal position, preferably adjacent to the floor of the chamber, by a series of evenly spaced metallic rollers (not shown) carried in a guiding frame structure generally indicated at 4 in Figures 4 and 5. On leaving the rear-end of the passage the upper reach 3 of the conveyor passes over a rearwardly extending glassware inspection and packing table 5, to a suitable conveyor supporting and driving mechanism 6 at the outer extremity of the inspection and packing table. The direction of the conveyor is changed by this supporting and driving mechanism and the return, or idle, reach 7 of the conveyor passes beneath the lehr where it is supported and guided at intervals by suitable supporting and guiding devices 8 and 9. At the front of the lehr, the conveyor passes into the longitudinal chamber or passage 2 beneath a vertically adjustable front door or closure 10, as shown in Figures 1 and 2. This front door or closure 10 may be adjusted vertically so that its lower edge is just high enough above the upper reach of the conveyor to afford clearance for the ware on the conveyor during any particular operation. The longitudinal chamber or passage 2 of the lehr may thus be partly closed at its front end to prevent egress of tunnel atmosphere above the level of the lower edge of the door or closure 10.

The lehr is supported above floor or ground level 11, so as to provide sufficient space for the return reach 7 of the conveyor and also so as to locate the upper, or ware carrying, reach 3 of the conveyor at a desired level. The supporting structure employed may consist of a suitable supporting framework, including upright legs or supporting members 12.

Except as to particular features which hereinafter will be specifically pointed out, the construction of the walls 1 will not be described in detail. Suitable refractory materials, insulating materials and metallic materials are employed and relatively arranged to provide lehr walls which define the aforesaid chamber or passage 2 and which are suitable for withstanding the elevated temperatures necessary for the desired thermal treatment of the glassware that is to be transported through the chamber. Thus, in the zones of relatively high temperature the walls consist of refractory material backed by suitable insulation. Other portions of the chamber, in which the temperatures are lower, have walls of less thickness and still cooler portions of the lehr have walls which are made mainly, if not entirely, of metallic material.

The passage or chamber 2 may conveniently be considered to comprise four zones viz: a preheating zone at the entrance to the lehr, a fusing or firing zone, an annealing zone, and a cooling zone. The preheating zone and the fusing zone are heated by radiant heat from electric heating elements 13 fitted transversely across the roof of the lehr, as indicated in Figure 2, and immediately beneath the upper reach of the conveyor, as indicated in Figures 4 and 5, the elements being spaced evenly along the passageway. A multiplicity of such heaters is provided, and any simple selector switch or switches may be associated with the elements so as to permit the selection of high or low temperature zones at any part of the preheating and fusing or firing zones as may be demanded by the particular type of glassware being processed, while any well known thermostatically controlled switch or switches may be used for the automatic control of the remainder of said elements. Two fans 14 are located in the roof of the lehr, at the firing or fusing zone, each fan delivering air into a pair of discharge ducts 15 in the roof of the lehr, each duct of a pair being directed in opposite directions (see Figure 3). Each discharge duct connects with a vertical duct 16 in the side walls of the lehr, each vertical duct having an angled end connection opening into the bottom of the chamber at 16A. The circulating air fans 14 are driven by an electric motor 17, and to avoid damage to said motors from conducted or convected heat, the motor is isolated from the fans 14 by the use of a well known flexible belt drive 18 (see Figure 2).

The fans 14 discharge air through the two discharge ducts 15, down the two side ducts 16 and out into the chamber at 16A. The air then passes upwardly through the conveyor and past the glassware in transit thereon, to the suction port 19 of the fan. It will be readily appreciated that in the course of such circulatory movement, the air will have first absorbed heat from the heating elements and then distributed such heat evenly over that section of the chamber and the glassware in transit therein. By automatic thermostatic control of the switching of the elements in the heating zone with which such circulating ir comes into contact, it will be seen that only such electrical current as is necessary to make up the heat lost by said circulating air to the glassware, the conveyor in transit, and to convection, need to added during the circulating cycle, therefore greatly assisting the economical function of the lehr.

A fan 20, located on the roof of the lehr and beyond the fans 14 in the direction of travel of the ware, supplies air, at substantially atmospheric temperature and at a low pressure (e.g. 25" water gauge) through a pipe 21 to a flat spiral bank or series of tubes 22 made of heat resisting metal, or refractory material. The tubes are situated in the roof of the tunnel immediately after the firing or fusing zone and extend transversely across the roof as shown in Figures 2 and 3. In passing through the tubes 22 the air cools the chamber and in so doing becomes heated so that it leaves the tubes at a higher temperature than that at which it entered the tubes. The heated air leaves the tubes through a connection 23 and passes along a pipe 24, leading from the connection 23, down the side wall of the lehr, and along beneath the chamber 2 to two manifolds, each of which is formed with a series of discharge ports 25 and 26 respectively. The discharge ports are transversely spaced across the width of the chamber, and are located below the lower heating elements 13, the first series of ports 25 being located just in front of the fans 14 and the second series of ports 26 being located nearer to the entrance of the chamber 2. An exhaust vent 27 is located above the first series of ports 25, there being a simple damper valve 28 in the vent, for controlling the outlet from the vent. A similar vent 29, also controllable by a damper valve 30, is located above the second series of ports 26, a control valve 31 being fitted in the pipe 24 and being arranged for proportioning the air between the two series of ports as required.

A fan 32, located near the outlet end of the lehr, supplies air at atmospheric temperature for the forced cooling of the glassware, the air passing through the cooling zone and out through an exhaust vent 34. The quantity of air supplied by the fan 32 can be regulated by a control valve 33 situated at the discharge side of the fan.

In the operation of the lehr described, the glassware, on which decorating matter of a ceramic nature has been placed, is carried through the lehr on the endless conveyor. The glassware may be at a relatively low temperature, such as the ambient air temperature, at the time it is moved into the chamber on the conveyor. It is necessary during the first stage of treatment to heat the ware in the lehr from the initial relatively low temperature up to the desired high temperature at which the decorating material will fuse on the glass. This latter temperature may be in the order of 100° F. or more above the upper annealing temperature of the ware, i.e. the temperature at which strains in the glass would be relieved. Thus the decoration fusing temperature may be 1100° F. to 1180° F. for glass having an upper annealing temperature point of around 1000° F.

A substantial period of time is required to raise the temperature of the decorated glassware to the decoration fusing temperature, during which period the ware is being transported through a portion of the lehr. This period of time may vary according to the starting temperature of the glass, the shape and/or thickness of the walls of the glassware, or other factors which may be involved in the treatment of the ware.

The ceramic decorating matter is carried in a suitable vehicle or medium such as wax, and applied to the glassware before the ware is placed in the oven. During the period in which the ware is being heated up to the decoration fusing temperature, the readily volatile matter of the vehicle volatilises off leaving the ceramic matter on the glassware, some of the vehicle being carbonised in situ and remaining on the ware as a carbonaceous deposit. To effect the removal of the carbonaceous deposit it is necessary for the ware to remain in an oxidising atmosphere at a temperature of, say between 650° F. and 850° F. for a considerable time. The final fusing temperature should not be attained until such time as the deposit has been completely burned off the ware. In order to remove the volatiles given off by the vehicle on heating, use is made of part of the air supplied by the fan 20, and heated during its passage through the tubes 22. The said air is supplied to the series of discharge ports 26, which are located at about the zone in which the vehicle is volatilised, and flows upwardly past the ware, carrying the volatiles to the fume vent 29, the temperature in this zone ranging from 200° F. to 500° F. It is thus possible to obtain a rapid removal of the volatiles, which would otherwise tend to reduce the oxidising ability of the atmosphere in the chamber, thereby increasing the period within which complete oxidation of the carbonaceous deposit can occur. To effect removal of the carbonaceous deposit another part of the air from the fan 20, is supplied to the series of discharge ports 25 which are located before the fusing and firing zone. By this means a constant supply of oxygen is provided at a point where it is most needed and as a result the speed of transit of the glassware through the lehr may be increased. The air is introduced into the lehr, at each location of introduction, at a temperature which is substantially equal to, or slightly greater than the temperature obtaining in the lehr at the location of introduction.

The ware is heated to the final fusing temperature in the preheating zone and is uniformly heated by the air circulated by the two fans 14. It is well known that in similar lehrs a system of circulating and reheating air is used where two or more volumes of such heated air are discharged into the lehr tunnel in substantially oppos.te rotary and transverse directions, thereby creating turbulence at that part of the tunnel chamber where the two substantially opposite volumes come into contact with each other. However, the method of passing all the heated air upwards and transversely through the fans eliminates any concentration of heat or "hot spots" in the chamber caused by said turbulence and therefore tends to promote a uniform temperature throughout the zone of influence of the circulating fans.

As already described, the glassware in a decorating lehr is raised to a temperature in the order of 100° F. above its upper annealing limit and is maintained at such a temperature for such time as is required to fuse the decoration to the glassware, but it is desirable to be able to reduce this temperature to the upper annealing limit as quickly as possible after the completion of the necessary firing or fusing period. This reduction in temperature is achieved by means of heat exchange between the hot air in the chamber and the cool air passing through the tubes 22. The air in the chamber is cooled and cools the glassware to the upper annealing temperature at an accelerated rate. The heat exchange also serves to preheat the air, which, after flowing through the tubes 22, is introduced into the lehr through the discharge ports 25 and 26, thus obviating the necessity for extraneously preheating such air.

The glassware then passes along the chamber and enters the cooling zone, where the ware is cooled by the air supplied from the fan, the ware finally arriving at the inspection and packing table 5 from which it is removed.

In the lehr hereinbefore described with reference to the accompanying drawings the preheating zone and the fusing zone are heated by electrical heating elements 13. However, the lehr may be heated by oil firing, or by gas-fired radiant tubes.

In the modification of the lehr shown in Figure 7, the pipe 24 of the lehr shown in Figures 1 to 6 is replaced by a pipe 24A which extends from the tubes 22, along the top of the lehr chamber in the fusing zone and then down the side wall of the lehr to the two series of discharge ports 25 and 26. By this means the air for introduction into the lehr is further preheated.

I claim:

1. A lehr for glassware on which ceramic decorative matter in a vaporisable vehicle has been placed, comprising means for conveying ware through the lehr, means for heating the ware in a pre-heating section of the lehr during the first part of its journey through the lehr, means for supplying air to said section from outside it, a first manifold device extending transverse to the direction of conveyance of the ware through the lehr for introducing a first part of the air supplied by said air supply means from outside said section into the lehr as a vertical curtain at about a first zone of said section in which the said vehicle vapourises, first venting means situated directly opposite said first manifold device for venting the introduced first part of the air which carries with it the vapours resulting from the vaporisation of said vehicle, a second manifold device extending transverse to the direction of conveyance of the ware through the lehr for introducing a second part of the air supplied by said air supply means from outside said section into the lehr as a vertical curtain at about a second zone of said section in which carbonaceous material derived from said vehicle will burn, second venting means situated directly opposite said second manifold device for venting the introduced second part of the air which carries with it gases resulting from the combustion of carbonaceous material, and means for pre-heating said first and second parts of air supplied by the air-supply means before the air is introduced into the lehr.

2. A lehr for glassware on which ceramic decorative matter in a vaporisable material has been placed, comprising means for conveying the ware through the lehr, means for heating the ware in a pre-heating section of the lehr during the first part of its journey through the lehr, means for supplying air to said section from outside it, a first manifold device extending transverse to the direction of conveyance of the ware through the lehr for introducing a first part of the air supplied by the air supply means from outside said section into the lehr as a first vertical curtain at about a first zone of said section in which the said vehicle vaporises, first venting means situated directly opposite said first manifold device for venting the introduced first part of the air which carries with it the vapours resulting from the vaporisation of said vehicle, a second manifold device extending transverse to the direction of conveyance of the ware through the lehr for introducing a second part of the air supplied by the air supply means from outside said section into the lehr as a second vertical curtain at about a second zone of said section in which carbonaceous material derived from said vehicle will burn, second venting means situated directly opposite said second manifold device for venting the introduced second part of the air which carries with it gases resulting from the combustion of said carbonaceous material, and heat-exchange means interposed on the air inlet sides of both said manifold devices, and located in the lehr after the heating means.

3. A lehr as claimed in claim 2, wherein said heat-exchange means is a bank of tubes disposed in the roof of the lehr.

4. A lehr as claimed in claim 2, wherein said heat-exchange means includes a conduit which passes through a fusing zone of the lehr, following said pre-heating section, and serves to convey the pre-heated air to said first and second manifold devices.

5. A lehr for glassware on which ceramic decorative matter in a vaporisable vehicle has been placed, comprising means for conveying the ware through the lehr, means for heating the ware in a pre-heating section of the lehr during the first part of its journey through the lehr, means for supplying air to said section from outside it, a first manifold device extending transversely across the bottom of the lehr for introducing a first part of the air into the lehr from outside said section as a first upwardly-flowing vertical curtain at about a first zone in which the said vehicle vaporises, first venting means disposed directly above said first manifold device for venting the introduced first part of the air which carries with it the vapours resulting from the vaporisation of said vehicle, a second manifold device extending transversely across the bottom of the lehr for introducing a second part of the air supplied by the air supply means from outside said section into the lehr as a second upwardly-flowing vertical curtain at about a second zone in which carbonaceous material derived from said vehicle will burn, second venting means disposed directly above said second manifold device for venting the introduced second part of the air which carries with it gases resulting from the combustion of said carbonaceous material, and heat exchange means in the lehr for pre-heating said first and second parts of the air each to a respective temperature which is not less than the temperature obtaining in the zone in which the air is to be introduced.

6. A lehr for glassware on which ceramic decorative matter in a vaporisable vehicle has been placed, comprising means for conveying ware through the lehr, means for heating the ware in a pre-heating section of the lehr during the first part of its journey through the lehr, means for supplying air to said section from outside it, a first manifold device extending transverse to the direction of conveyance of the ware through the lehr for introducing a first part of the air supplied by said air supplying means from outside said section into the lehr as a vertical curtain at about a first zone of said section in which the said vehicle vaporises, first venting means situated directly opposite said first manifold device for venting the introduced first part of the air which carries with it the vapours resulting from the vaporisation of said vehicle, a second manifold device extending transverse to the direction of conveyance of the ware through the lehr for introducing a second part of the air supplied by said air supply means from outside said section into the lehr as a vertical curtain at about a second zone of said section in which carbonaceous material derived from said vehicle will burn, second venting means situated directly opposite said second manifold device for venting the introduced second part of the air which carries with it gases resulting from the combustion of carbonaceous material, means for pre-heating said first and second parts of air supplied by the air-supply means before the air is introduced into the lehr, and manually operable valve means for proportioning the pre-heated air between each manifold device.

7. A lehr for glassware on which ceramic decorative matter in a vaporisable vehicle has been placed, comprising means for conveying ware through the lehr, means for heating the ware during the first part of its journey through the lehr, air-supply means, a first manifold device extending transverse to the direction of conveyance of the ware through the lehr for introducing a first part of the air supplied by said air supply means into the lehr as a vertical curtain at about a first zone in which the said vehicle vaporises, first venting means in association with said first manifold device for venting the introduced first part of the air which carries with it the vapours resulting from the vaporisation of said vehicle, a second manifold device extending transverse to the direction of conveyance of the ware through the lehr for introducing a second part of the air supplied by said air supply means into the lehr as a vertical curtain at about a second zone in which carbonaceous material derived from said vehicle will burn, second venting means in association with said second manifold device for venting the introduced second part of the air which carries with it gases resulting from the combustion of carbonaceous material, means for pre-heating said first and second parts of air supplied by the air-supply means before the air is introduced into the lehr, vertical ducts formed in the walls of the lehr at about a firing and fusing zone, and fan means associated with said ducts for causing an upward circulation of the air past the ware in a direction transverse to the direction of conveyance thereof through the lehr.

8. A lehr for glassware on which ceramic decorative matter in a vaporisable vehicle has been placed, comprising means for conveying ware through the lehr, means for heating the ware during the first part of its journey through the lehr, air-supply means, a first manifold device extending transverse to the direction of conveyance of the ware through the lehr for introducing a first part of the air supplied by said air supply means into the lehr as a vertical curtain at about a first zone in which the said vehicle vaporises, first venting means in association with said first manifold device for venting the introduced first part of the air which carries with it the vapours resulting from the vaporisation of said vehicle, a second manifold device extending transverse to the direction of conveyance of the ware through the lehr for introducing a second part of the air supplied by said air supply means into the lehr as a vertical curtain at about a second zone in which carbonaceous material derived from said vehicle will burn, second venting means in association with said second manifold device for venting the introduced second part of the air which carries with it gases resulting from the combustion of carbonaceous material, means for pre-heating said first and second parts of air supplied by the air-supply means before the air is introduced into the lehr, fan means mounted in the roof of the lehr at about a firing and fusing zone, oppositely directed ducts in the roof of the lehr with which ducts the fan means are associated, and vertical ducts in the wall of the lehr connected at their upper ends to the ducts in the roof of the lehr, and opening into the lehr at or near the bottom thereof.

9. A lehr for glassware on which ceramic decorative matter in a vaporisable vehicle has been placed, comprising means for conveying the ware through the lehr, a multiplicity of electrically operable radiant heating elements located in the roof of the lehr and near the bottom of the lehr for heating the ware in a pre-heating section of the lehr during the first part of its journey through the lehr, means for supplying air to said section from outside it, a first manifold device extending transverse to the direction of conveyance of the ware through the lehr for introducing a first part of the air supplied by the air supply means from outside said section into the lehr as a vertical curtain at about a first zone of said section in which the said vehicle vaporises, first venting means situated directly opposite said first manifold device for venting the introduced air which carries with it the vapours resulting from the vaporisation of said vehicle, a second manifold device extending transverse to the direction of conveyance of the ware through the lehr for introducing a second part of the air supplied by the air supply means from outside said section into the lehr as a vertical curtain at about the second zone of said section in which carbonaceous material derived from said vehicle will burn, second venting means situated directly opposite said second manifold device for venting the introduced second part of the air which carries with it the gases resulting from the combustion of said carbonaceous material, and cooling tubes, for pre-heating the air, disposed between said air supply means and the manifold devices, and disposed in the roof of the lehr after the heating elements.

10. A lehr for glassware on which ceramic decorative matter in a vaporisable vehicle has been placed, comprising means for conveying the ware through the lehr, a multiplicity of electrically operable radiant heating elements located in the roof of the lehr and near the bottom of the lehr for heating the ware in a pre-heating section of the lehr during the first part of its journey through the lehr, means for selectively and thermostatically controlling said elements, means for supplying air to said section from outside it, a first manifold device extending transverse to the direction of conveyance of the ware through the lehr for introducing a first part of the air supplied by the air supply means from outside said section into the lehr as a vertical curtain at about a first zone of said section in which the said vehicle vaporises, first venting means situated directly opposite said first manifold device for venting the introduced air which carries with it the vapours resulting from the vaporisation of said vehicle, a second manifold device extending transverse to the direction of conveyance of the ware through the lehr for introducing a second part of the air supplied by the air supply means from outside said section into the lehr as a vertical curtain at about the second zone of said section in which carbonaceous material derived from said vehicle will burn, second venting means situated directly opposite said second manifold device for venting the introduced second part of the air which carries with it the gases resulting from the combustion of said carbonaceous material, and cooling tubes, for pre-heating the air, disposed between said air supply means and the manifold devices, and disposed in the roof of the lehr after the heating elements.

11. A lehr for glassware on which ceramic decorative matter in a vaporisable vehicle has been placed, comprising means for conveying ware through the lehr, means for heating the ware in a pre-heating section of the lehr during the first part of its journey through the lehr, means for supplying air to said section from outside it, a first manifold device extending transverse to the direction of conveyance of the ware through the lehr for introducing a first part of the air supplied by said air supply means from outside said section into the lehr as a vertical curtain at about a first zone of said section in which the said vehicle vaporises, first venting means situated directly opposite said first manifold device for venting the introduced first part of the air which carries with it the vapours resulting from the vaporisation of said vehicle, a second manifold device extending transverse to the direction of conveyance of the ware through the lehr for introducing a second part of the air supplied by said air supply means from outside said section into the lehr as a vertical curtain at about a second zone of said section in which carbonaceous material derived from said vehicle will burn, second venting means situated directly opposite said second manifold device for venting the introduced second part of the air which carries with it gases resulting from the combustion of carbonaceous material, means for preheating said first and second parts of air supplied by the air-supply means before the air is introduced into the lehr, a fusing or firing zone in said lehr following said pre-heating section, an annealing zone in said lehr following said fusing or firing zone, a cooling zone in said lehr following said annealing zone and means for passing air at substantially atmospheric temperature, across the ware in said cooling zone so as to cool the ware.

12. A lehr for glassware on which ceramic decorative matter in a vaporisable vehicle has been placed, comprising means for conveying the ware through the lehr, a multiplicity of electrically operable radiant heating elements located in the roof of the lehr and near the bottom of the lehr for heating the ware during the first part of its journey through the lehr, means for selectively and thermostatically controlling said elements, first air supply means, a first manifold device extending transversely across the bottom of the lehr for introducing a part of the air supplied by the first supply means into the lehr as a first upwardly-flowing vertical curtain at about a first zone in which said vehicle vaporises, first damper-controlled venting means disposed above said first manifold device for venting the introduced first part of the air which carries with it the vapours resulting from the vaporisation of said vehicle, a second manifold device extending transversely across the bottom of the lehr for introducing a second part of the air supplied by the first air supply means into the lehr as a second upwardly-flowing vertical curtain at about a second zone of the lehr which follows said first zone and in which carbonaceous material derived from said vehicle will burn, second damper-controlled venting means disposed above said second manifold device for venting the introduced second part of the air which carries with it gases resulting from the combustion of said carbonaceous material, a bank of tubes interposed between said first air supply means and said first and second manifold devices, and located in the roof of the lehr after, but near to the heating elements, a fusing or firing zone in said lehr following said second zone, an annealing zone in said lehr following said fusing or firing zone, a cooling zone in said lehr following said annealing zone, a conduit passing through the fusion zone of the lehr and connecting said bank of tubes to the manifold devices, fan means mounted in the roof of the lehr at said fusing or firing zone, duct means leading from said fan means to the bottom of the lehr, said fan means being arranged to circulate air upwardly past the ware in a direction transverse to the direction of conveyance of the ware through the lehr, and second air supply means for passing air at substantially atmospheric temperature across the ware in said cooling zone so as to cool the ware.

References Cited in the file of this patent
UNITED STATES PATENTS

| | | |
|---|---|---|
| 1,484,116 | Dressler | Feb. 19, 1924 |
| 1,599,589 | Richardson | Sept. 14, 1926 |
| 1,701,223 | Bergman | Feb. 5, 1929 |
| 1,837,311 | Amsler | Dec. 22, 1931 |
| 1,854,452 | Cramer | Apr. 19, 1932 |
| 1,862,548 | Prouty et al. | June 14, 1932 |
| 1,949,716 | Harsch | Mar. 6, 1934 |
| 1,979,662 | Bethel | Nov. 6, 1934 |
| 1,982,478 | Morton et al. | Nov. 27, 1934 |
| 2,133,783 | Merrill | Oct. 18, 1938 |
| 2,133,784 | Merrill | Oct. 18, 1938 |
| 2,330,984 | Merrill | Oct. 5, 1943 |
| 2,335,128 | Merrill | Nov. 23, 1943 |
| 2,458,040 | Weller | Jan. 4, 1949 |
| 2,660,832 | Merrill | Dec. 1, 1953 |
| 2,669,068 | Wambreuze | Feb. 16, 1954 |

FOREIGN PATENTS

| | | |
|---|---|---|
| 963,542 | France | Jan. 4, 1950 |